United States Patent
Klinger et al.

(10) Patent No.: US 10,379,826 B1
(45) Date of Patent: Aug. 13, 2019

(54) DETERMINING INPUTS TO AN INTEGRATION FLOW COMPONENT

(71) Applicant: INTERNATIONAL BUSINESS MACHINES CORPORATION, Armonk, NY (US)

(72) Inventors: Doina L. Klinger, Winchester (GB); John A. Reeve, Winchester (GB); Chengxuan Xing, Romsey (GB); Ashley Harrison, Southampton (GB); Shanna Xu, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/915,443

(22) Filed: Mar. 8, 2018

(51) Int. Cl.
*G06F 8/41* (2018.01)

(52) U.S. Cl.
CPC .............. *G06F 8/433* (2013.01); *G06F 8/443* (2013.01)

(58) Field of Classification Search
None
See application file for complete search history.

(56) References Cited

U.S. PATENT DOCUMENTS

| | | | | |
|---|---|---|---|---|
| 7,814,460 B2 * | 10/2010 | Bucklew | ................... | G06F 8/34 717/105 |
| 9,134,960 B2 * | 9/2015 | Kudikala | ................... | G06F 8/10 |
| 9,361,323 B2 * | 6/2016 | Agarwal | ................... | G06F 7/00 |
| 9,646,117 B1 * | 5/2017 | Kotzabasakis | ..... | G06Q 10/0633 |
| 9,691,050 B2 * | 6/2017 | Li | ........................... | G06Q 10/10 |
| 9,710,773 B2 * | 7/2017 | Sanabria | ................ | G06Q 10/06 |
| 2016/0057033 A1 * | 2/2016 | Hall | ........................ | G06F 15/16 709/205 |

OTHER PUBLICATIONS

API Evangelist; Continuous Integration Platform as a Service at the Command Line; Apr. 20, 2017; URL: https://apievangelist.com/2017/04/20/continous-integration-plafform-as-a-service-at-the-command-line/; retrieved from the Internet Oct. 16, 2017; 5 pages.

* cited by examiner

*Primary Examiner* — Hossain M Morshed
(74) *Attorney, Agent, or Firm* — Schmeiser, Olsen & Watts; William H. Hartwell

(57) ABSTRACT

An approach is provided for determining inputs to a component of an integration flow. First component(s) that are upstream of the component in a given level of the integration flow are identified. First output schema(s) of the first component(s) are determined. In response to determining one or more components of the integration flow contain the component from one or more levels above the given level of the hierarchy of the integration flow, second component(s) that are upstream of the one or more components that contain the component are identified, second output schema(s) of the second component(s) are determined, and the first and second output schemas are presented as the inputs to the component.

20 Claims, 5 Drawing Sheets

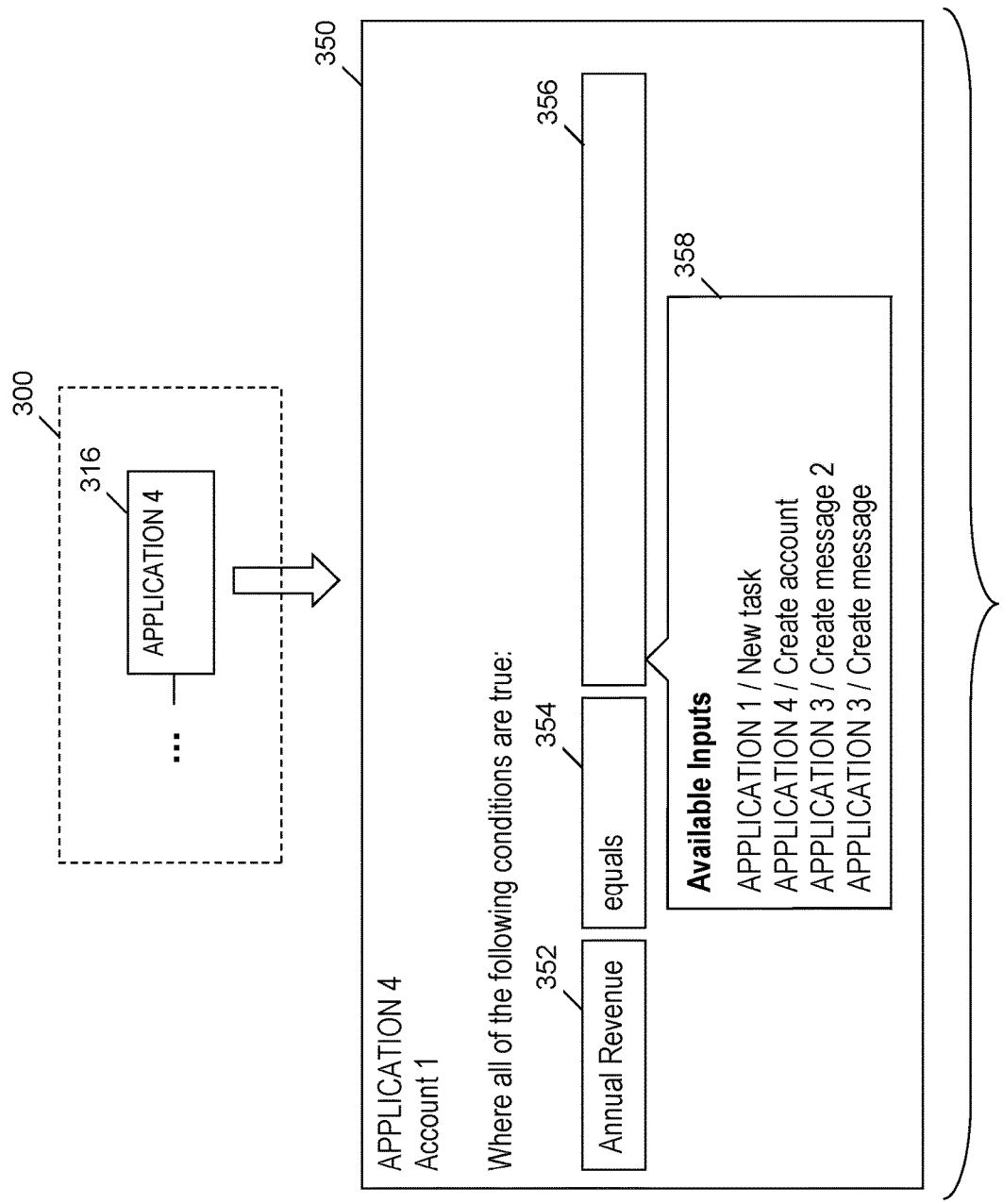

DETERMINING INPUTS TO AN INTEGRATION FLOW COMPONENT

BACKGROUND

The present invention relates to managing an integration flow, and more particularly to computing inputs to a component in an integration flow.

Integration products implement trigger-action, data synchronization and batch scenarios between different applications. An integration flow is an artifact of an integration product, produced by a tool such as a graphical flow editor and executed by the integration product runtime. An integration flow is a sequence of nodes (i.e., components) that are linked together and represent an event-driven control through an integration, which is a software development activity in which separate software components are combined into an executable whole. Each of the nodes in an integration flow typically performs an integration action (e.g., accessing an external system and retrieving data from the external system, posting data to an external system, or making a call to an external system and generating data from the call). Each node in the integration flow is a component which has inputs and outputs that encapsulate a particular interaction with an object exposed by an external application. When a user configures a component of an integration flow, the shape of the object that is produced by the operation (i.e., the schema) is discovered from the application. The schema represents the output of the component of the integration flow.

The context of an integration flow specifies data that may be used to perform actions by components of the integration flow at a particular time. A context object (e.g., a JavaScript® Object Notation (JSON) document) specifies the context of the integration flow. JavaScript is a registered trademark of Oracle America, Inc. located in Redwood Shores, Calif. At the beginning of the integration flow, the context in the context object contains data from the event that drives the integration flow. As the integration flow executes, more data is added to the context. Any action performed in the integration flow can be configured to use data from what is in the context at a given time.

SUMMARY

In one embodiment, the present invention provides a method of determining inputs to a component of an integration flow. The method includes a computer identifying first one or more other components of the integration flow that are upstream of the component in a given level of a hierarchy of the integration flow. The method further includes the computer determining first one or more output schemas of the identified first one or more other components. The method further includes in response to determining one or more components of the integration flow contain the component from one or more levels above the given level of the hierarchy of the integration flow, the computer identifying second one or more other components of the integration flow that are upstream of the one or more components that contain the component, determining second one or more output schemas of the identified second one or more other components, and presenting the first one or more output schemas and the second one or more output schemas as the inputs to the component.

In another embodiment, the present invention provides a computer program product for determining inputs to a component of an integration flow. The computer program product includes a computer readable storage medium having program instructions stored on the computer readable storage medium. The computer readable storage medium is not a transitory signal per se. The program instructions are executed by a central processing unit (CPU) of a computer system to implement a method. The method includes the computer system identifying first one or more other components of the integration flow that are upstream of the component in a given level of a hierarchy of the integration flow. The method further includes the computer system determining first one or more output schemas of the identified first one or more other components. The method further includes in response to determining one or more components of the integration flow contain the component from one or more levels above the given level of the hierarchy of the integration flow, the computer system identifying second one or more other components of the integration flow that are upstream of the one or more components that contain the component, determining second one or more output schemas of the identified second one or more other components, and presenting the first one or more output schemas and the second one or more output schemas as the inputs to the component.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of determining inputs to a component of an integration flow. The method includes the computer system identifying first one or more other components of the integration flow that are upstream of the component in a given level of a hierarchy of the integration flow. The method further includes the computer system determining first one or more output schemas of the identified first one or more other components. The method further includes in response to determining one or more components of the integration flow contain the component from one or more levels above the given level of the hierarchy of the integration flow, the computer system identifying second one or more other components of the integration flow that are upstream of the one or more components that contain the component, determining second one or more output schemas of the identified second one or more other components, and presenting the first one or more output schemas and the second one or more output schemas as the inputs to the component.

Embodiments of the present invention provide a less error-prone and less time-consuming way of authoring a given node in an integration flow by dynamically retrieving information from nodes that are executed prior to the given node in the integration flow and based on the retrieved information, determining the actual data that is available as input to the given node.

BRIEF DESCRIPTION OF THE DRAWINGS

FIG. 3B is an example of inputs available to a component in the integration flow of FIG. 3A, in accordance with embodiments of the present invention.

DETAILED DESCRIPTION

Overview

Embodiments of the present invention dynamically determine inputs that are available to a component of an integration flow based on a location of the component in an integration flow. Output schemas of components of the integration flow that are executed on a path to a given component are added to the context and passed as inputs that are available to the given component. Determining the inputs of a component takes into account inner and nested scopes of the integration flow. After determining the inputs of a given component of an integration flow, embodiments of the present invention generate a display of a list of the inputs that is included in a graphical construct that depicts the integration flow, where the graphical construct is generated and modified by an integration flow editor.

The determination of the inputs of a current component may include identifying components upstream of the current component and performing a recursive procedure that identifies component(s) (i.e., containers) that contain the current component and identifies components that are upstream of each of the identified containers until the container at the top level (i.e., topmost scope) of the hierarchy of the integration flow is processed by the recursive procedure.

Embodiments of the present invention may determine different inputs for multiple occurrences of the same component inserted into different locations in the integration flow (i.e., the different inputs are dependent upon the locations in the integration flow from which the identical components are invoked and what other components are executed before each the identical components).

As used herein, an output schema is defined as a definition of a structure of data that a component of an integration flow will produce as output.

System for Determining Inputs to an Integration Flow Component

Figure 1:
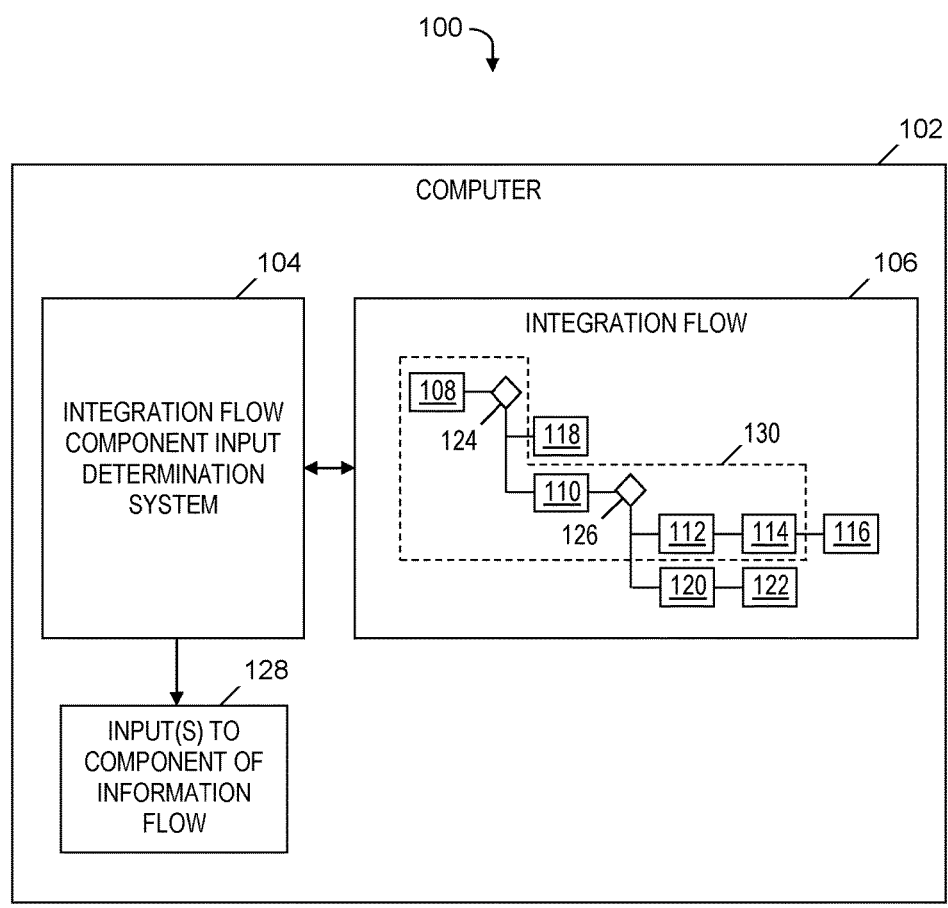
FIG. 1 is a block diagram of a system for determining inputs to a component in an integration flow, in accordance with embodiments of the present invention.

FIG. 1 is a block diagram of a system 100 for determining inputs to a component in an integration flow, in accordance with embodiments of the present invention. System 100 includes a computer 102 which executes a software-based integration flow component input determination system 104. In one embodiment, integration flow component input determination system 104 is included in a software-based integration flow editor (not shown) that generates and modifies an integration flow 106 as a graphical construct. For example, the integration flow editor may encode the structure of integration flow 106 in a JSON document and generate integration flow 106 as a graphical construct by utilizing the JSON document. In one embodiment, integration flow 106 includes components 108, 110, 112, 114, 116, 118, 120, and 122 and decision points 124 and 126. Alternatively, integration flow 106 may include a different number of components in a different hierarchical configuration (i.e., different from the number and configuration shown in FIG. 1) or may include the aforementioned components in a hierarchical configuration that is different from the configuration shown in FIG. 1.

Integration flow component input determination system 104 may insert a component (e.g., component 116) into integration flow 106. Hereinafter in the discussion of FIG. 1, the inserted component is referred to as component 116, but the inserted component may be any of the components in integration flow 106. Based on the position of inserted component 116 in integration flow 106, integration flow component input determination system 104 may dynamically determine input(s) 128 that are available to inserted component 116. Integration flow component input determination system 104 determines input(s) 128 by identifying the output schema of other components 108, 110, 112, and 114 in integration flow 106 that are executed on a path 130 in integration flow 106 to inserted component 116.

In one embodiment, integration flow component input determination system 104 generates a display of inputs 128 that are available to inserted component 116 in response to an activation by a user of a graphical element in a graphical user interface (GUI) that includes integration flow 106. In one embodiment, integration flow component input determination system 104 (see FIG. 1) presents the display of inputs 128 as potential entries, where the user may select one of the displayed inputs 128 to enter into a field in the GUI. In one embodiment, integration flow component input determination system 104 uses the input selected from the displayed inputs 128 to generate at least a portion of the program code that is used to execute an action in integration flow 106, such as interacting with an object exposed by an external application.

As one example, component 108 interacts with a first application to create a new task. One of the properties in the output schema of component 108 is the name of the new task. First decision point 124 examines the name of the new task and if the name is "MyProject," the flow proceeds to component 110, which publishes a message on a channel. The output of component 110, including the contents of the message being published, is defined using attributes from the input of component 110 (i.e., the new task created by component 108). Thus, the message produced by component 110 may include the name of the new task. After the message is published by component 110, another decision point 126 determines whether the message was published on an "Internal" channel. If the message was published on an Internal channel, the flow proceeds to components 112, 114, and 116, which create an account, create another message, and update a spreadsheet, respectively.

The functionality of the components shown in FIG. 1 is described in more detail in the discussion of FIG. 2, FIG. 3A, FIG. 3B, and FIG. 4 presented below.

Process for Determining Inputs to an Integration Flow Component

Figure 2:
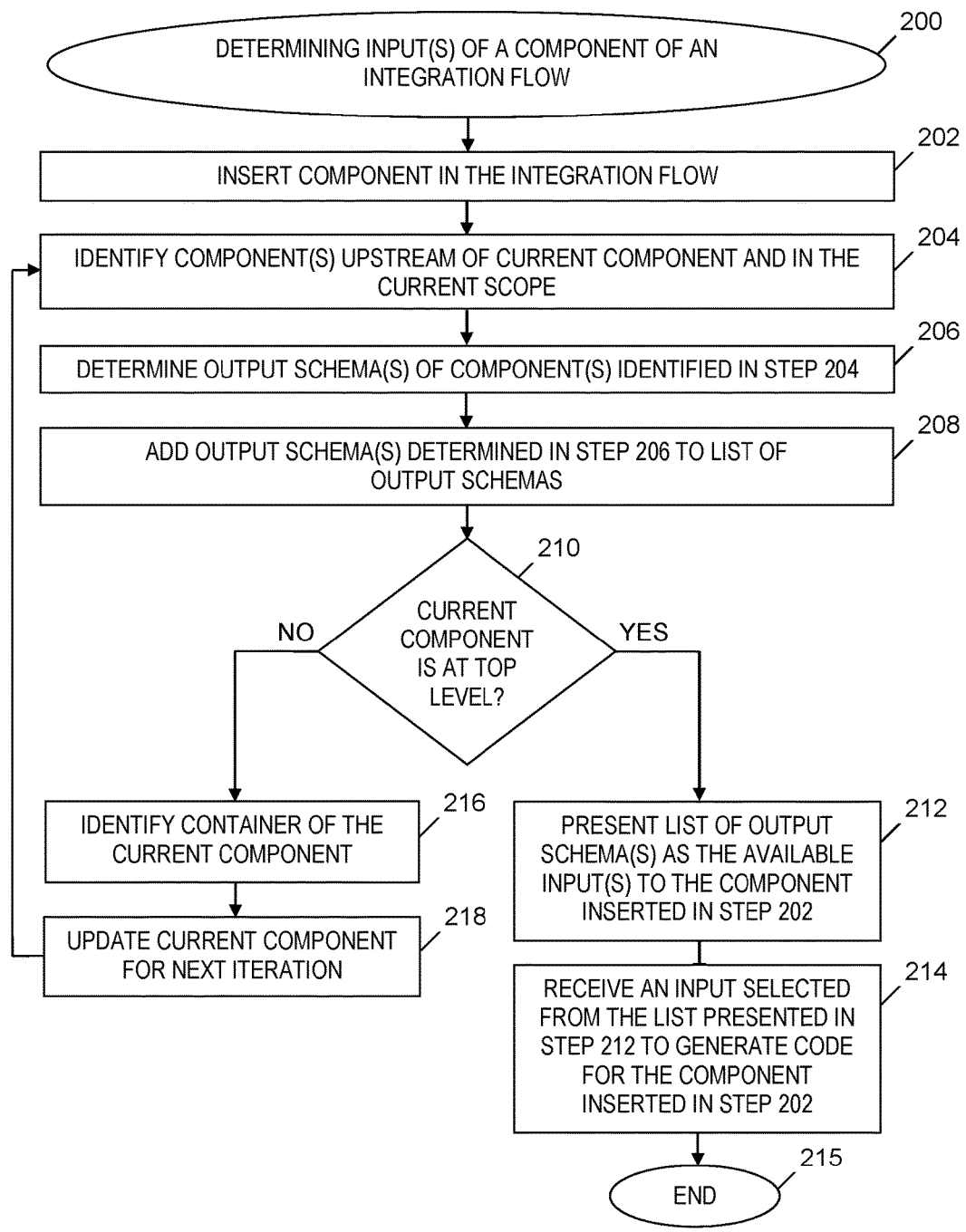
FIG. 2 is a flowchart of a process of determining inputs to a component in an integration flow, where the process is implemented by the system of FIG. 1, in accordance with embodiments of the present invention.

FIG. 2 is a flowchart of a process of determining inputs to a component in an integration flow, where the process is implemented by the system of FIG. 1, in accordance with embodiments of the present invention. The process of FIG. 2 starts at step 200. In step 202, integration flow component input determination system 104 (see FIG. 1) inserts a component (e.g., component 116 in FIG. 1) in integration flow 106 (see FIG. 1). In the first iteration of a loop that starts at step 204, the component inserted in step 202 is referred to as the current component.

In step 204, integration flow component input determination system 104 (see FIG. 1) identifies other component(s) that are upstream of the current component and in the current scope in integration flow 106 (see FIG. 1). The current scope is the scope of the current component in integration flow 106 (see FIG. 1). For example, component 112 (see FIG. 1) and component 114 (see FIG. 1) are upstream of component 116 (see FIG. 1) and are in the scope of component 116 (see FIG. 1).

In step 206, integration flow component input determination system 104 (see FIG. 1) determines output schema(s) of the other component(s) identified in step 204.

In step 208, integration flow component input determination system 104 (see FIG. 1) adds the output schema(s) determined in step 206 to a list of output schemas. In one embodiment, prior to step 204, integration flow component input determination system 104 (see FIG. 1) initializes the list of output schemas to an empty list.

In step 210, integration flow component input determination system 104 (see FIG. 1) determines whether the current component is at the top level (i.e., topmost scope) of the hierarchy of integration flow 106 (see FIG. 1). In one embodiment, the top level of the hierarchy of integration flow 106 (see FIG. 1) includes the component that specifies an event that initiates integration flow 106 (see FIG. 1). For example, component 108 (see FIG. 1) is at the top level of integration flow 106 (see FIG. 1).

If integration flow component input determination system 104 (see FIG. 1) determines in step 210 that the current component is at the top level of the hierarchy of integration flow 106 (see FIG. 1), then the Yes branch of step 210 is followed and step 212 is performed. In step 212, integration flow component input determination system 104 (see FIG. 1) presents the list of output schema(s) as being the input(s) 128 (see FIG. 1) that are available to the component inserted in the integration flow in step 202. In step 214, integration flow component input determination system 104 (see FIG. 1) receives an input selected from the list presented in step 212. The process of FIG. 2 ends at step 215.

In one embodiment, step 212 includes integration flow component input determination system 104 (see FIG. 1) displaying multiple inputs 128 (see FIG. 1) as the selections that a user may choose from to generate program code of the component inserted in step 202. In one embodiment, a selection from the displayed inputs 128 (see FIG. 1) received in step 214 specifies the data and the external system that is accessed by the code being generated for the component. For example, integration flow component input determination system 104 (see FIG. 1) receives in step 214 a selection of one of the inputs presented in step 212 and the received selection specifies program code that is generated to access data from a particular external system specified by the selected input.

Returning to step 210, if integration flow component input determination system 104 (see FIG. 1) determines that the current component is not at the top level of the hierarchy of integration flow 106 (see FIG. 1), then the No branch of step 210 is followed and step 216 is performed.

In step 216, integration flow component input determination system 104 (see FIG. 1) identifies a container of the current component (i.e., identifies another component in integration flow 106 (see FIG. 1) whose scope contains the scope of the current component). For example, the decision point 126 is the container of components 112, 114, and 116 in FIG. 1.

In step 218, integration flow component input determination system 104 (see FIG. 1) updates the current component for the next iteration of the loop starting at step 204. Step 218 includes integration flow component input determination system 104 (see FIG. 1) setting the current component to be the container identified in step 216. Following step 218, the process of FIG. 2 begins the next iteration of the loop starting at step 204, with the current component in the next iteration being the container identified in the most recent performance of step 216.

In one embodiment, the output schema(s) are determined in step 206 based on integration flow component input determination system 104 generating mappings for properties in a property data structure in each component of integration flow 106 (see FIG. 1). A mapping defines how to calculate values that are used to interact with an external system. As one example, the output schema defines that call of a method on an external system requires that an object with firstName and lastName fields be passed on. The mapping in this example describes how the values for firstName and lastName are calculated (e.g., by taking values from the context and applying some transformations to the values). The output schema is the definition of the data and the mappings specify the values.

A mapping associates fields in a property of a given component with source fields (i.e., output schema) of component(s) that are positioned in integration flow 106 (see FIG. 1) to execute prior to the given component. In one embodiment, the mapping is saved as a JSON document. The source fields are available as the input selected and received in step 214.

EXAMPLE

Figure 3A:
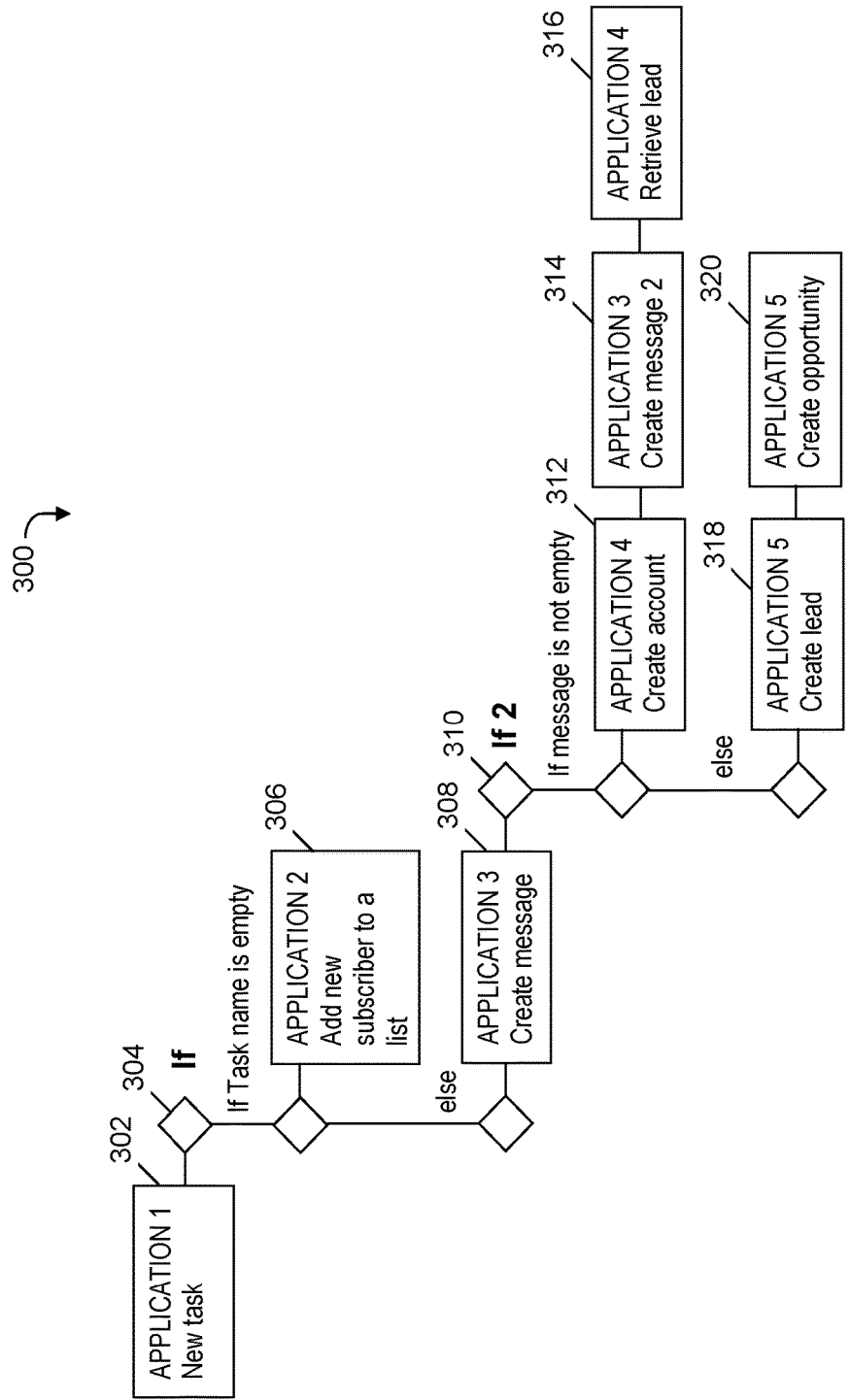
FIG. 3A is an example of an integration flow whose components have available inputs that are determined by the process of FIG. 2, in accordance with embodiments of the present invention.

FIG. 3A is an example of an integration flow 300 whose components have available inputs that are determined by the process of FIG. 2, in accordance with embodiments of the present invention. Integration flow 300 includes a topmost level component 302, a first decision point 304, components 306 and 308, a second decision point 310, components 312, 314, and 316, and components 318 and 320. Component 316 is the component inserted in step 202 (see FIG. 2). Components 312 and 314 are the components identified in step 204 (see FIG. 2) as being upstream of component 316 and in the current scope of component 316. The output schemas of components 312 and 314 are determined in step 206 (see FIG. 2) and added to a list of output schemas in step 208 (see FIG. 2).

Since it is determined in step 210 (see FIG. 2) that the component 316 is not at the topmost level of integration flow 300, decision point 310 is identified in step 216 (see FIG. 2) as the container of component 316. Component 308 is identified in the next iteration of step 204 (see FIG. 2) as being upstream and in the current scope of decision point 310. The output schemas of component 308 are determined in step 206 (see FIG. 2) and added to the list of output schemas in step 208 (see FIG. 2).

Since it is determined in step 210 (see FIG. 2) that component 308 is not at the topmost level of integration flow 300, decision point 304 is identified in step 216 (see FIG. 2) as the container of component 308. Component 302 is identified in the next iteration of step 204 (see FIG. 2) as being upstream and in the current scope of decision point 304. The output schemas of component 302 are determined in step 206 (see FIG. 2) and added to the list of output schemas in step 208 (see FIG. 2).

Since it is determined in step 210 (see FIG. 2) component 302 is at the topmost level of integration flow 300, the list of output schemas is complete and are presented in step 212 (see FIG. 2) as the available inputs to component 316.

FIG. 3B is an example 350 of inputs available to a component 316 in the integration flow 300 of FIG. 3A, in accordance with embodiments of the present invention. Example 350 includes fields 352, 354, and 356 of a property of component 316. In step 212 (see FIG. 2), Integration flow component input determination system 104 (see FIG. 1) displays available inputs 358 that are available for entry into field 356.

Computer System

Figure 4:
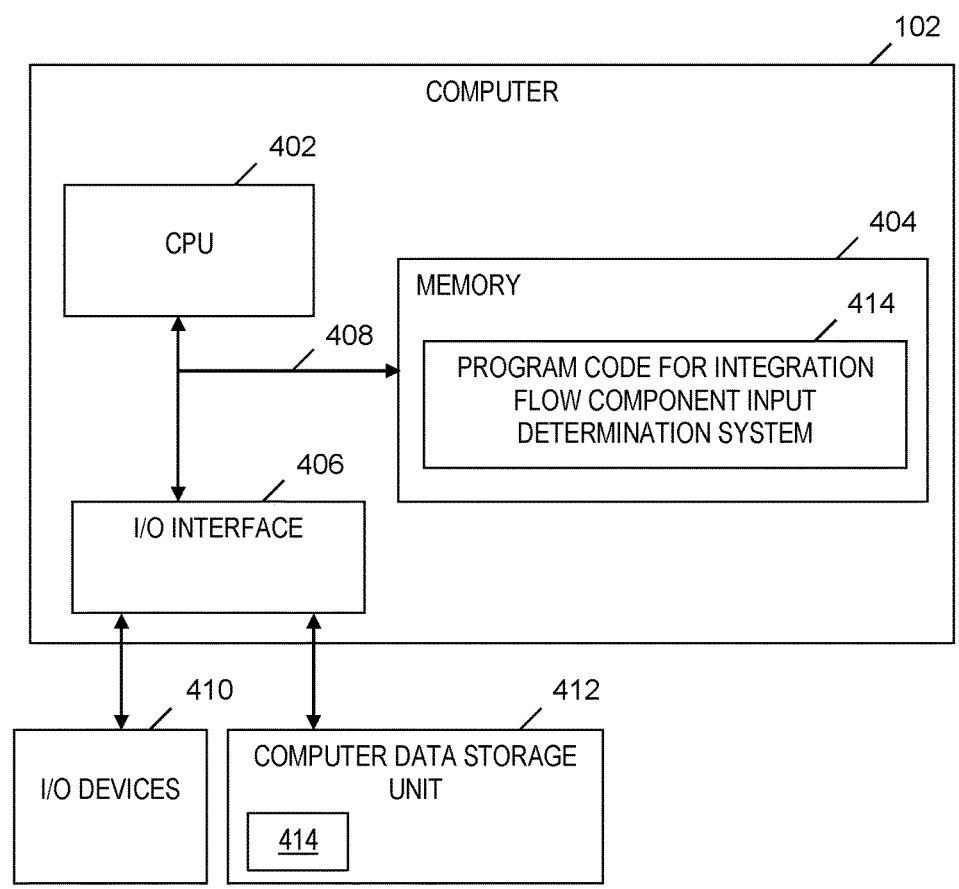
FIG. 4 is a block diagram of a computer that is included in the system of FIG. 1 and that implements the process of FIG. 2, in accordance with embodiments of the present invention.

FIG. 4 is a block diagram of a computer 102 that is included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 to perform a method of determining inputs of a component of an integration flow, where the instructions' are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to determine inputs of a component of an integration flow. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) may include integration flow 106 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to determining inputs of a component of an integration flow. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to determine inputs of a component of an integration flow. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of determining inputs of a component of an integration flow.

While it is understood that program code 414 for determining inputs of a component of an integration flow may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of determining inputs of a component of an integration flow. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing an integration flow by determining inputs to a component of the integration flow and combining separate components into an executable whole, the method comprising the steps of:
a computer identifying first one or more other components of the integration flow that are upstream of the component in a given level of a hierarchy of the integration flow;
the computer determining first one or more output schemas of the identified first one or more other components;
in response to determining one or more components of the integration flow contain the component from one or more levels above the given level of the hierarchy of the integration flow, the computer identifying second one or more other components of the integration flow that are upstream of the one or more components that contain the component, determining second one or more output schemas of the identified second one or more other components, and displaying presenting the first one or more output schemas and the second one or more output schemas as the inputs to the component;
the computer selecting one of the displayed inputs; and
using the selected input, the computer generating at least a portion of a program code that is used to execute an action in the integration flow, the action including interacting with an object exposed by an external application.

2. The method of claim 1, further comprising the steps of:
the computer identifying third one or more other components of the integration flow that are upstream of a second component in another given level of the hierarchy of the integration flow;
the computer determining third one or more output schemas of the identified third one or more other components; and
in response to determining no component of the integration flow contains the second component, the computer presenting the third one or more output schemas as one or more inputs to the second component.

3. The method of claim 1, further comprising the steps of:
the computer determining the component of the integration flow is in a nested level of the integration flow;
responsive to determining that the component is in the nested level, the computer performing a recursive procedure that includes the computer identifying a container component of the integration flow that contains the component, determining component(s) of the integration flow that are upstream of the container component, determining output schemas of the component(s) that are upstream of the container component, adding the output schemas to a context of the component, and designating the container component as the component in a next iteration of the recursive procedure, wherein the recursive procedure is performed until the container component designated as the component in the next iteration is in a top level of the hierarchy of the integration flow; and
in response to the container component designated as the component in the next iteration being in the top level, the computer identifying other component(s) of the integration flow that are upstream of the container component in the top level, determining other output schemas of the identified other component(s), and adding the other output schemas to the context, wherein the step of determining the second one or more output schemas is based on the context.

4. The method of claim 1, further comprising the steps of:
the computer determining the one or more components contain the component; and
the computer accessing the component to modify the component or to validate contents of the component,
wherein the steps of identifying the first one or more other components, determining the first one or more output schemas, identifying the second one or more other components, determining the second one or more output schemas, and presenting the first one or more output schemas and the second one or more output schemas as the inputs to the component are dynamically performed in response the component being accessed to modify the component or validate the contents of the component.

5. The method of claim 1, further comprising the steps of:
the computer inserting a second component into the integration flow;
the computer determining that the inserted second component is upstream of the component in the given level of the hierarchy of the integration flow;
the computer determining an output schema of the inserted second component; and
based on the inserted second component being upstream of the component in the given level of the hierarchy of the integration flow, the computer modifying the first one or more output schemas to include the output schema of the inserted second component and the computer presenting the modified first one or more output schemas as being included in the inputs to the component.

6. The method of claim 1, further comprising the steps of:
the computer inserting a second component into the integration flow;
the computer determining that the inserted second component is upstream of the one or more components that contain the component;
the computer determining an output schema of the inserted second component; and
based on the inserted second component being upstream of the one or more components that contain the component, the computer modifying the second one or more output schemas to include the output schema of the inserted second component and the computer presenting the first one or more output schemas and the modified second one or more output schemas as the inputs to the component.

7. The method of claim 1, further comprising the steps of:
the computer receiving, via a graphical user interface (GUI), actions of a user that generates the component in the integration flow; and
the computer presenting to the user via the GUI the inputs of the component as being a complete list of inputs available to the component, which constrains the user to writing code for the component that accesses data that is required to be in the complete list of inputs.

8. The method of claim 1, further comprising the steps of: subsequent to presenting the first one or more output schemas and the second one or more output schemas as the inputs, the computer moving the component to a new location in the integration flow; and based on the component being moved to the new location, the computer determining other input(s) to the component which are different from the first one or more output schemas and the second one or more output schemas.

9. The method of claim 1, further comprising the step of: providing at least one support service for at least one of creating, integrating, hosting, maintaining, and deploying computer readable program code in the computer, the program code being executed by a processor of the computer to implement the steps of identifying the first one or more other components of the integration flow that are upstream of the component in the given level of the hierarchy of the integration flow, determining the first one or more output schemas, identifying the second one or more other components of the integration flow that are upstream of the one or more components that contain the component, determining the second one or more output schemas, and presenting the first one or more output schemas and the second one or more output schemas as the inputs to the component.

10. A computer program product for managing an integration flow by determining inputs to a component of the integration flow and combining separate components into an executable whole, the computer program product comprising a computer readable storage medium having program instructions stored in the computer readable storage medium, wherein the computer readable storage medium is not a transitory signal per se, the program instructions are executed by a central processing unit (CPU) of a computer system to cause the computer system to perform a method comprising the steps of:

the computer system identifying first one or more other components of the integration flow that are upstream of the component in a given level of a hierarchy of the integration flow;

the computer system determining first one or more output schemas of the identified first one or more other components;

in response to determining one or more components of the integration flow contain the component from one or more levels above the given level of the hierarchy of the integration flow, the computer system identifying second one or more other components of the integration flow that are upstream of the one or more components that contain the component, determining second one or more output schemas of the identified second one or more other components, and displaying the first one or more output schemas and the second one or more output schemas as the inputs to the component;

the computer system selecting one of the displayed inputs; and using the selected input, the computer system generating at least a portion of a program code that is used to execute an action in the integration flow, the action including interacting with an object exposed by an external application.

11. The computer program product of claim 10, wherein the method further comprises the steps of:

the computer system identifying third one or more other components of the integration flow that are upstream of a second component in another given level of the hierarchy of the integration flow;

the computer system determining third one or more output schemas of the identified third one or more other components; and in response to determining no component of the integration flow contains the second component, the computer system presenting the third one or more output schemas as one or more inputs to the second component.

12. The computer program product of claim 10, wherein the method further comprises the steps of:

the computer system determining the component of the integration flow is in a nested level of the integration flow;

responsive to determining that the component is in the nested level, the computer system performing a recursive procedure that includes the computer system identifying a container component of the integration flow that contains the component, determining component(s) of the integration flow that are upstream of the container component, determining output schemas of the component(s) that are upstream of the container component, adding the output schemas to a context of the component, and designating the container component as the component in a next iteration of the recursive procedure, wherein the recursive procedure is performed until the container component designated as the component in the next iteration is in a top level of the hierarchy of the integration flow; and in response to the container component designated as the component in the next iteration being in the top level, the computer system identifying other component(s) of the integration flow that are upstream of the container component in the top level, determining other output schemas of the identified other component(s), and adding the other output schemas to the context, wherein the step of determining the second one or more output schemas is based on the context.

13. The computer program product of claim 10, wherein the method further comprises the steps of:

the computer system determining the one or more components contain the component; and the computer system accessing the component to modify the component or to validate contents of the component, wherein the steps of identifying the first one or more other components, determining the first one or more output schemas, identifying the second one or more other components, determining the second one or more output schemas, and presenting the first one or more output schemas and the second one or more output schemas as the inputs to the component are dynamically performed in response the component being accessed to modify the component or validate the contents of the component.

14. The computer program product of claim 10, wherein the method further comprises the steps of:

the computer system inserting a second component into the integration flow;

the computer system determining that the inserted second component is upstream of the component in the given level of the hierarchy of the integration flow;

the computer system determining an output schema of the inserted second component; and based on the inserted second component being upstream of the component in the given level of the hierarchy of the integration flow, the computer system modifying the first one or more output schemas to include the output schema of the inserted second component and the computer system presenting the modified first one or more output schemas as being included in the inputs to the component.

15. The computer program product of claim 10, wherein the method further comprises the steps of:
the computer system inserting a second component into the integration flow;
the computer system determining that the inserted second component is upstream of the one or more components that contain the component;
the computer system determining an output schema of the inserted second component; and
based on the inserted second component being upstream of the one or more components that contain the component, the computer system modifying the second one or more output schemas to include the output schema of the inserted second component and the computer system presenting the first one or more output schemas and the modified second one or more output schemas as the inputs to the component.

16. A computer system comprising:
a central processing unit (CPU);
a memory coupled to the CPU; and
a computer readable storage medium coupled to the CPU, the computer readable storage medium containing instructions that are executed by the CPU via the memory to implement a method of managing an integration flow by determining inputs to a component of the integration flow and combining separate components into an executable whole, the method comprising the steps of:
the computer system identifying first one or more other components of the integration flow that are upstream of the component in a given level of a hierarchy of the integration flow;
the computer system determining first one or more output schemas of the identified first one or more other components;
in response to determining one or more components of the integration flow contain the component from one or more levels above the given level of the hierarchy of the integration flow, the computer system identifying second one or more other components of the integration flow that are upstream of the one or more components that contain the component, determining second one or more output schemas of the identified second one or more other components, and displaying the first one or more output schemas and the second one or more output schemas as the inputs to the component;
the computer system selecting one of the displayed inputs; and
using the selected input, the computer system generating at least a portion of a program code that is used to execute an action in the integration flow, the action including interacting with an object exposed by an external application.

17. The computer system of claim 16, wherein the method further comprises the steps of:
the computer system identifying third one or more other components of the integration flow that are upstream of a second component in another given level of the hierarchy of the integration flow;
the computer system determining third one or more output schemas of the identified third one or more other components; and
in response to determining no component of the integration flow contains the second component, the computer system presenting the third one or more output schemas as one or more inputs to the second component.

18. The computer system of claim 16, wherein the method further comprises the steps of:
the computer system determining the component of the integration flow is in a nested level of the integration flow;
responsive to determining that the component is in the nested level, the computer system performing a recursive procedure that includes the computer system identifying a container component of the integration flow that contains the component, determining component(s) of the integration flow that are upstream of the container component, determining output schemas of the component(s) that are upstream of the container component, adding the output schemas to a context of the component, and designating the container component as the component in a next iteration of the recursive procedure, wherein the recursive procedure is performed until the container component designated as the component in the next iteration is in a top level of the hierarchy of the integration flow; and
in response to the container component designated as the component in the next iteration being in the top level, the computer system identifying other component(s) of the integration flow that are upstream of the container component in the top level, determining other output schemas of the identified other component(s), and adding the other output schemas to the context, wherein the step of determining the second one or more output schemas is based on the context.

19. The computer system of claim 16, wherein the method further comprises the steps of:
the computer system determining the one or more components contain the component; and
the computer system accessing the component to modify the component or to validate contents of the component,
wherein the steps of identifying the first one or more other components, determining the first one or more output schemas, identifying the second one or more other components, determining the second one or more output schemas, and presenting the first one or more output schemas and the second one or more output schemas as the inputs to the component are dynamically performed in response the component being accessed to modify the component or validate the contents of the component.

20. The computer system of claim 16, wherein the method further comprises the steps of:
the computer system inserting a second component into the integration flow;
the computer system determining that the inserted second component is upstream of the component in the given level of the hierarchy of the integration flow;
the computer system determining an output schema of the inserted second component; and
based on the inserted second component being upstream of the component in the given level of the hierarchy of the integration flow, the computer system modifying the first one or more output schemas to include the output schema of the inserted second component and the computer system presenting the modified first one or more output schemas as the inputs to the component.

\* \* \* \* \*